United States Patent [19]

Chun

[11] Patent Number: 5,719,629
[45] Date of Patent: Feb. 17, 1998

[54] MOTION PICTURE ENCODING METHOD AND APPARATUS THEREOF

[75] Inventor: Kang-Wook Chun, Seoul, Rep. of Korea

[73] Assignee: Samsung Electronics Co., Ltd., Kyungki-do, Rep. of Korea

[21] Appl. No.: 777,381

[22] Filed: Dec. 27, 1996

[30] Foreign Application Priority Data

Dec. 27, 1995 [KR] Rep. of Korea ............ 59425/1995

[51] Int. Cl.$^6$ ............................................. H04N 7/36
[52] U.S. Cl. ...................... 348/413; 348/416; 348/420; 348/699
[58] Field of Search ............................... 348/699, 420, 348/409, 413, 416; H04N 7/36

[56] References Cited

U.S. PATENT DOCUMENTS

| | | | |
|---|---|---|---|
| 4,208,810 | 6/1980 | Rohner | 348/123 |
| 4,291,380 | 9/1981 | Rohner | 248/123 |
| 5,099,325 | 3/1992 | Arteri et al. | 348/420 |
| 5,363,107 | 11/1994 | Gertz | 342/26 |

*Primary Examiner*—Howard W. Britton
*Attorney, Agent, or Firm*—Sughrue, Mion, Zinn, Macpeak & Seas, PLLC

[57] ABSTRACT

A motion picture encoding method and apparatus which divides a previous frame of a motion picture into arbitrary quadrilateral objects, obtains a predictive error through movement trace and prediction for each quadrilateral object; and encodes each quadrilateral object independently by converting the predictive error from a quadrilateral unit into a square object having K×K dimensions, where K is an integer.

7 Claims, 4 Drawing Sheets

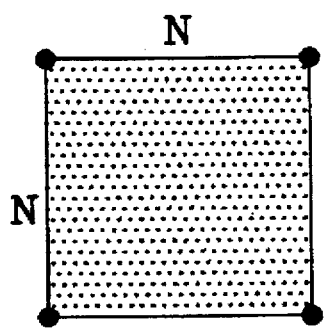
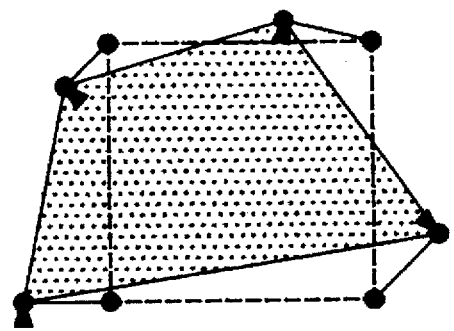
(PRIOR ART)
Fig. 2A
(PRIOR ART)
Fig. 2B

MOTION PICTURE ENCODING METHOD AND APPARATUS THEREOF

BACKGROUND OF THE INVENTION

1. Field of the Invention

The present invention relates to a system for encoding a motion picture, and more particularly to a method of encoding a motion picture using a conversion encoding technique and an apparatus thereof. The present application is based upon Korean Application No. 59425/1995, which is incorporated herein by reference.

2. Description of the Related Art

For the encoding of a motion picture, there have been many techniques in which each frame of the motion picture is divided into quadrilateral objects, the movement is traced by each quadrilateral object unit, and movement compensation is performed using image warping. The techniques are published under the title of "A Novel Video Coding Scheme Based on Temporal Prediction using Digital Image Warping" (J. Neiweglowski, G. Cambell, and P. Haavisto, pp. 141–150, IEEE Trams. on Consumer Electronics, August, 1993) (document 1) and "Active Mesh-A Feature Seeking and Tracking Image Sequence Representation Scheme" (Y. Wang and O. Lee, PP. 610–624, IEEE Trams. on Image Processing, September, 1994) (document 2).

The basic configuration of these techniques is shown in FIG. 1.

An initial mesh generator 2 divides each frame of a motion picture into square initial meshes (or objects). An object transformer 4 transforms the initial square objects into arbitrary quadrilateral objects. A movement tracer 6 traces, with respect to a time axis, the movement of each corner of the arbitrary quadrilateral object generated from the object transformer 4. A movement compensating and frame predictor 8 predicts a current frame from the previous frame through image warping on the basis of assumed movement vector. A predictive error encoder 10 obtains an error between the current frame and a frame predicted from the movement compensating and frame predictor 8 and encodes an error signal in accordance with the error.

The motion picture encoding method will now be described with reference to the structure of FIG. 1.

Here, it is noted that the frame input to be currently encoded according to a time sequence of motion picture input is referred to as a current frame and the frame just next to the current frame is referred to as a previous frame. The previous frame means a frame on which encoding and decoding has been completed and is available for both an encoder and a decoder.

When the current frame to be currently encoded is input, the decoded previous frame is divided in the initial mesh generator 2 into initial square objects (or meshes) having N×N dimensions. The initial square objects are represented by four corners as shown in FIG. 2A and the position of each corner representing the square object is transferred in accordance with the spatial or temporal complexity of each frame. During the transferal of the corners, spatial and temporal change rates of a pixel value at each position of each corner are used to determined the degree and location of the movement of the corner. The square objects are transformed into arbitrary quadrilateral objects, as shown in FIG. 2B, by transferring the position of each corner representing the square object. The movement in the time axis of each corner of the square object is traced by the movement tracer 6 with respect to the arbitrary square object generated in the object transformer 4. To trace the movement vector of each corner, there are tracing methods of using the pixel value change rate of space and time and using a modification of a general block matching technique. The movement vector is traced within a scope where the form of the square to be transformed by the movement vector does not destroy the basic structure of a square. When the movement vector to each corner of the square object is traced in the movement tracer 6, the current frame is predicted from the previous frame through the image warping in the movement compensating and frame predictor 8. The image warping is done through a method using linear interpolation suggested in the document 2 and using affine conversion after dividing the quadrilateral into two triangles which is suggested in the document 1.

In the predictive error encoder 10, an error signal is encoded after configuring an error frame constituted by a predictive error, through a process of obtaining a difference between the current frame and a frame predicted from the movement vectors of the corners of each quadrilateral object of the previous frame. To encode the error frame, each error frame is divided into square blocks having a K×K size and the block is encoded in accordance with a degree of the error by adaptively using a conversion encoding technique such as discrete cosine transform (DCT).

In the motion picture encoding technique using the known image warping as above, the previous frame is divided into quadrilateral objects and the movement vector with respect to the corners of each square is movement-compensated using trace and warping thereof. Thus, the predictive frame formed for the movement compensation is represented through arbitrary quadrilateral objects and the predictive error is also formed by a unit of an arbitrary quadrilateral object (or block). In the known technology, the predictive error frame is formed at a previous frame area and the predictive error is encoded using such conversion encoding technique as DCT by dividing again the predictive error frame into square objects. However, in case of prediction using warping, since each arbitrary quadrilateral object exhibits its feature independently, the known predictive error encoding method, in which the predictive error frame is divided again into the square objects, cannot reflect such features of the predictive errors. Accordingly, the known encoding method has a low efficiency in the predictive error encoding.

In a motion picture encoding algorithm using image warping or active mesh, predictive error according to movement prediction and compensation has an independent feature with respect to a quadrilateral object. Therefore, since the present invention can independently encode a quadrilateral object, the efficiency of encoding is improved, thereby providing a superior quality motion picture of at the same bit rate as the known encoding algorithm.

SUMMARY OF THE INVENTION

To overcome the above problems, it is an object of the present invention to provide a motion picture encoding method which improves the encoding efficiency of the predictive error and an apparatus thereof.

It is another object of the present invention to provide a method of converting an object represented in an arbitrary quadrilateral form into a square object and encoding the same using a general conversion encoding algorithm with respect to the converted square.

Those and other objects of the present invention can be accomplished with a method of encoding a motion picture, comprising the steps of: (a) dividing a previous frame of said motion picture into an arbitrary quadrilateral objects; (b) obtaining a predictive error through movement trace and prediction by a unit of each quadrilateral object; and (c) encoding each quadrilateral object independently by converting said predictive error represented as each quadrilateral unit in response to said obtaining step into a square object having a K×K size, wherein K is an integer.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 2A and 2B are views showing spatial transformation of a prior art quadrilateral object;

DETAILED DESCRIPTION OF THE PREFERRED EMBODIMENT

Figure 1:
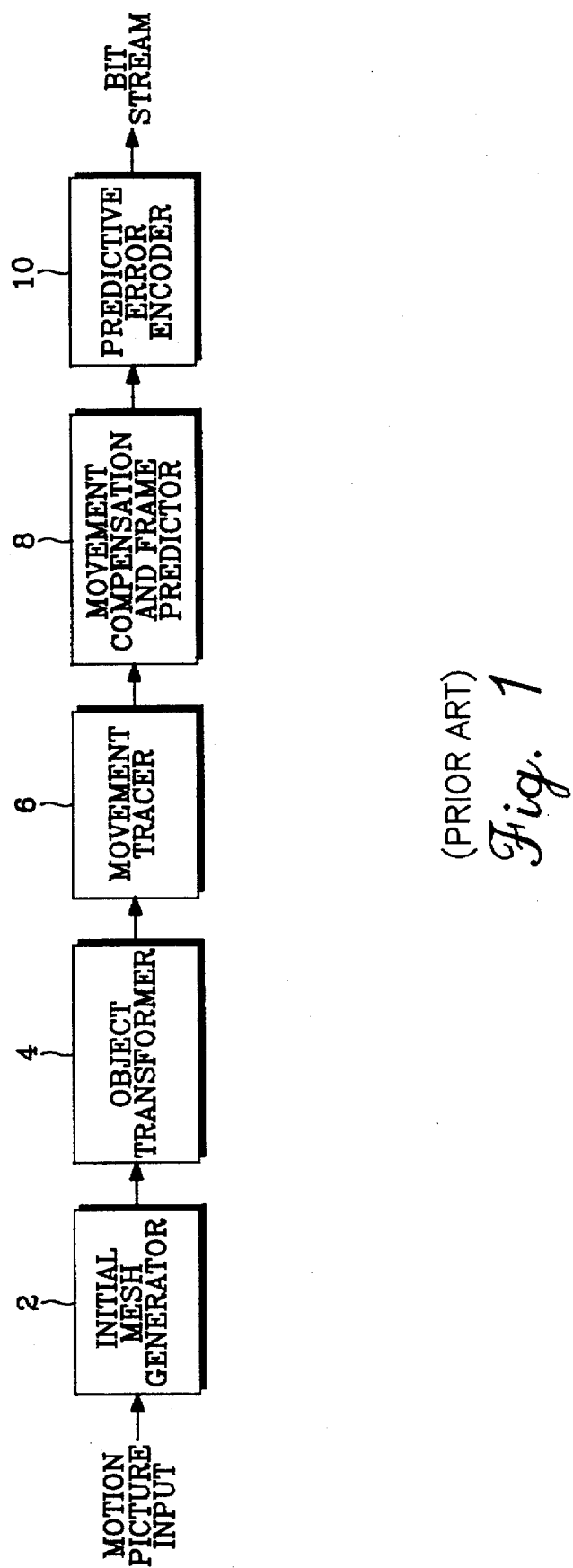
FIG. 1 is a prior art block diagram for the motion picture encoding.
Figure 3:
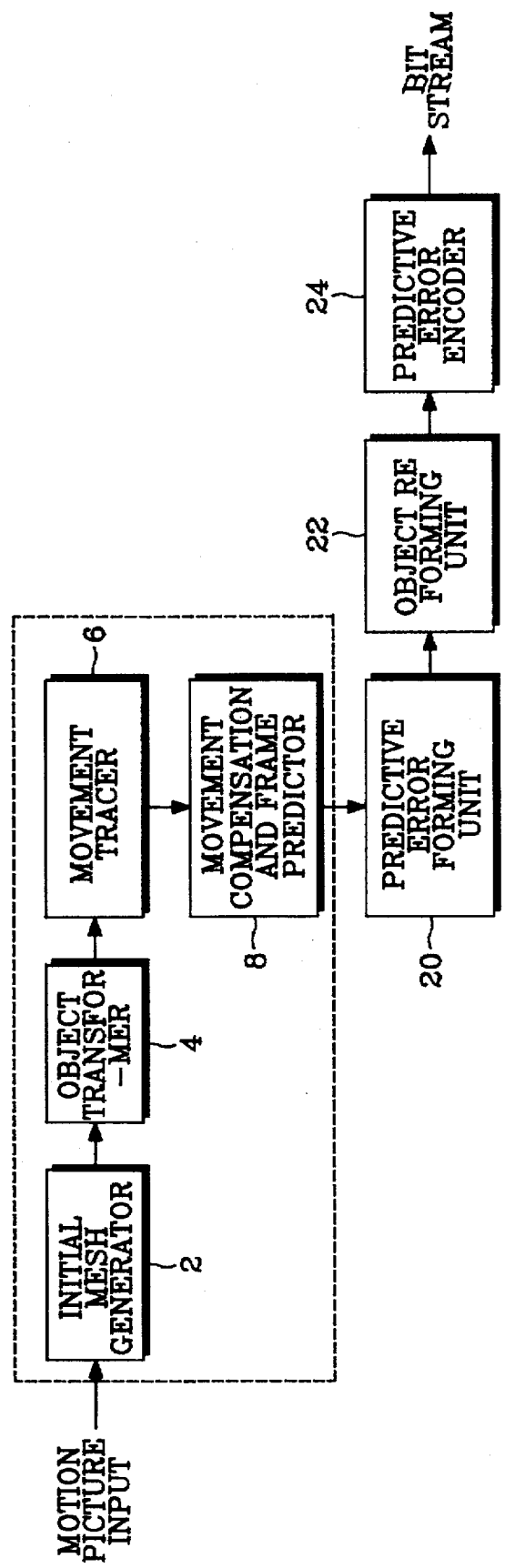
FIG. 3 is a block diagram of the present invention for the motion picture encoding.

In FIG. 3, an initial mesh generator 2, an object transformer 4, a movement tracer 6 and a movement compensation and frame predictor 8 which are indicated by a dotted block are the same elements as in the prior art technology. However, a predictive error forming unit 20 and an object re-forming unit 22 are added in the present invention. The predictive error forming unit 20 is for calculating a predictive error by a quadrilateral unit forming a predictive object and generating a predictive error signal of a quadrilateral form. The object re-forming unit 22 is for re-forming the predictive error signal from an arbitrary quadrilateral form into a square form. A predictive error encoder 24 is for encoding the predictive error signal of a square form transformed in the object reforming unit 22 using a conversion encoding method.

The operation of the present invention having such a structure will now be described in detail.

The encoded previous frame is divided into initial meshes (or objects) of a square form in the initial mesh generator 2. The initial square meshes are transformed into an arbitrary quadrilateral in the object transforming unit 4. The movement along a time axis of each quadrilateral object with respect to the arbitrary quadrilateral objects generated from the object transforming unit 4 is traced. Through image warping, a predictive object is made from the quadrilateral object of the previous frame based on the movement vector traced in the movement compensation and frame predictor 8.

The predictive error forming unit 20 generates a predictive error signal for each quadrilateral object. That is, the predictive error is present within the arbitrary quadrilateral object. The object re-forming unit 22 converts the predictive error signal defined in a quadrilateral form into a square object having a K×K size.

The operation of the object re-forming unit 22 will be described in detail with reference to FIG. 4.

Figure 4:
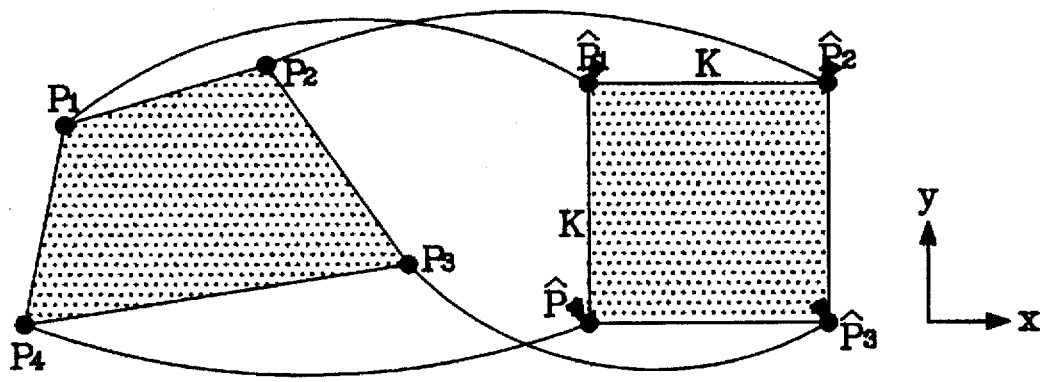
FIG. 4 is a view showing a process of transforming from an arbitrary quadrilateral object having a predictive error therein to a square object according to the present invention.

In FIG. 4, assuming that the coordinates of the corners of the quadrilateral object are $P_1$, $P_2$, $P_3$ and $P_4$ with respect to the predictive error defined in a square form, the corners are mapped to $\hat{P}^1$, $\hat{P}^2$, $\hat{P}^3$ and $\hat{P}^4$ which are the corners of the square object through an object re-formation algorithm. All of the inside the rectangular object are converted into the points inside the square object according to the above mapping rule. The conversion is performed by the object re-formation algorithm by which an arbitrary rectangular object is converted into a square object.

Prior to the description of the algorithm, the coordinates of the rectangular object of FIG. 4 are defined as follows.

The spatial positions of respective corners of the quadrilateral object are defined that $P_1=(x1, y2)$ $P_2=(x1, y2)$, $P_3=(x3, y3)$ and $P_4=(x4, y4)$ (here, $P_1$ indicates a left-most point among the four corners). The spatial positions of respective corners of the square object having a K×K size are defined that $\hat{P}_1=(\hat{x}_1, \hat{y}_1)$, $\hat{P}_2=(\hat{x}_2, \hat{y}_2)$, $\hat{P}_3=(\hat{x}_3, \hat{y}_3)$, and $\hat{P}_4=(\hat{x}_4, \hat{y}_4)$. The corners of the object are connected in order, forming a closed loop. In the square, $\hat{P}_1$ denotes a point in the upper left, $\hat{P}_2$ in the upper right, $\hat{P}_3$ in the lower right, and $\hat{P}_4$ in the lower left.

The object re-forming algorithm is made of the following four steps.

<1st step of setting initial point>

The corner $P_1$ which is the left-most among the corners of the quadrilateral object is selected to be set as the initial point $\hat{P}_1$ of the square object.

<2nd step of mapping corners of quadrilateral object>

The initial point, $\hat{P}_1$ has two neighboring corners $\hat{P}_2$ and $\hat{P}_4$. A neighboring point having the greater value in the y-direction is mapped to $\hat{P}_2$ and a neighboring point having the smaller value in the y-direction is mapped to $\hat{P}_4$, by comparing the position in the y-direction of the adjacent corners $\hat{P}_2$ and $\hat{P}_4$. The corner of the quadrilateral object at a diagonal position of the initial point $P_1$ is automatically mapped to $\hat{P}_3$.

<3rd step of calculating transformation vector at each corner of quadrilateral object>

When the mapping of the corners of the quadrilateral object is determined in step 2, a transformation vector $d_1$ indicating a degree of mapping is calculated as follows.

$$d_i = \hat{P}_i - P_i, \ i=1, 2, 3, 4$$

<4th step of interpolation>

The transformation vectors at respective points inside the quadrilateral object are determined by linear interpolation using the transformation vectors of the corners of the quadrilateral object.

Thus, when the transformation vector by which a quadrilateral object is mapped to a square object through such an object re-formation algorithm is determined, each position inside the quadrilateral object is moved inside the square. Accordingly, the value of the error signal at each position inside the square can be determined by the linear interpolation method.

Thus, in the predictive error encoder 24, the error signal defined to a square object is converted to be encoded using a two-dimensional DCT having dimensions of K×K. The encoding method using the two-dimensional DCT converts the K×K error signal using the two-dimensional DCT and a DCT coefficient is quantized at a conversion domain and encoded using variable length encoding.

In a decoder, the steps of the above process are reversed, and a variable length decoding is performed by receiving a variable-length-encoded bit stream. Through reverse-quatization and reverse-DCT, the K×K error signal is restored. The K×K size error signal re-forms the quadrilateral object in a reverse process of the object transformation algorithm and restores the error signal represented by the quadrilateral object.

In the present invention, as a technique to transform an arbitrary quadrilateral object into a square object, is a method of linearly interpolating transformation vectors of the corners of the quadrilateral object. However, an affine conversion method in which a quadrilateral object is divided into two triangular objects can be employed or an interpolation method of a high degree can also be used.

Also, in the present invention, a conversion encoding method of a two-dimensional DCT is used to encode an error signal of K×K size generated from the transformation from an error signal defined to a quadrilateral object to an error signal of K×K size. Another algorithm can also be used for that purpose. That is, a vector quatization method of a K×K size can be used and the K×K error signal can be divided again to be encoded.

Further, in the present invention, the inner value is applied as an error signal to a quadrilateral object. However, the object transformation algorithm can be used to encode a signal having a general gray value.

In a motion picture encoding algorithm using image warping or active mesh, predictive error according to movement prediction and compensation is performed independently with respect to a quadrilateral object. Therefore, since the present invention can independently encode a quadrilateral object, the efficiency of encoding is improved, thereby providing motion picture of superior quality at the same bit rate as the known encoding algorithm.

It should be understood that the present invention is not limited to the particular embodiments disclosed herein, except as defined in the appended claims.

What is claimed is:

1. A method of encoding a motion picture, comprising the steps of:
   (a) dividing a previous frame of said motion picture into arbitrary quadrilateral objects;
   (b) obtaining a respective predictive error through movement trace and prediction for each of said quadrilateral objects, said respective prediction error being represented as a quadrilateral unit; and
   (c) encoding each of said quadrilateral objects independently by converting said respective predictive error into a square object having K×K dimensions, wherein K is an integer.

2. A method of encoding a motion picture, comprising the steps of:
   (a) dividing a decoded previous frame into initial meshes of a square form;
   (b) transforming said square initial meshes into arbitrary quadrilateral objects;
   (c) generating traced movement vectors by tracing the movement of each of said quadrilateral objects in a time axis;
   (d) making respective predictive objects from said arbitrary quadrilateral objects through image warping based on said traced movement vectors;
   (e) generating a predictive error signal from a respective one of said predictive objects for each of said arbitrary quadrilateral objects;
   (f) converting said predictive error signal from a quadrilateral form into a square object having K×K dimensions; and
   (g) encoding said predictive error signal converted to the square object using a predetermined conversion encoding method.

3. A method of encoding a motion picture as claimed in claim 2, wherein said step (f) comprises the steps of:
   (h) selecting a corner $P_1$ which is left-most among the corners of a quadrilateral object and setting said selected corner as an initial point $\hat{P}_1$ of a square object;
   (i) mapping a neighboring corner having a greater value in a y-direction to $\hat{P}_2$ and a neighboring corner having a smallest value in a y-direction to $\hat{P}_4$, by comparing positions in the y-direction of the two adjacent corners $\hat{P}_2$ and $\hat{P}_4$ at said initial point $\hat{P}_1$, and mapping a corner of a quadrilateral object which is at a diagonal position of said initial point $\hat{P}_1$ to $\hat{P}_3$;
   (j) calculating a transformation vector at the corners of said quadrilateral object when the mapping of the four corners of said quadrilateral object is determined; and
   (k) determining said transformation vectors at respective positions inside said quadrilateral object by linear interpolation using said transformation vector of each of the four corners of said quadrilateral object.

4. A method of encoding a motion picture as claimed in claim 3, wherein the calculating of said step (j) uses $$d_i = \hat{P}_i - P_i, \; i=1, 2, 3, 4,$$

wherein $d_i$ is a transformation vector indicating a degree of mapping.

5. An apparatus for encoding a motion picture, comprising:
   an initial mesh generator for dividing a decoded previous frame into square initial meshes;
   an object transformer for transforming said square initial meshes into arbitrary quadrilateral objects;
   a movement tracer for tracing in a time axis movement of each of said quadrilateral objects, thereby generating traced movement vectors;
   a movement compensating and frame predictor for making respective predictive objects from said arbitrary quadrilateral objects of said previous frame through image warping on the basis of said traced movement vectors;
   a predictive error forming unit for generating a respective predictive error signal from said formed predictive objects for each of said arbitrary quadrilateral objects;
   an object re-forming unit for converting said predictive error signal from a quadrilateral form into a square object having K×K dimensions; and
   a predictive error encoder for encoding said corrected predictive error signal from the square object using a predetermined conversion encoding method.

6. An apparatus for encoding a motion picture as set forth in claim 5, wherein said predictive error forming unit comprises:
   means for selecting a corner $P_1$ which is left-most among the corners of a quadrilateral object and setting said selected corner as an initial point $\hat{P}_1$ of a square object;
   means for mapping a neighboring corner having a greater value in a y-direction to $\hat{P}_2$ and a neighboring corner having a smallest value in a y-direction to $\hat{P}_4$, by comparing positions in the y-direction of the two adjacent corners $\hat{P}_2$ and $\hat{P}_4$ at said initial point $\hat{P}_1$, and mapping a corner of a quadrilateral object which is at a diagonal position of said initial point $\hat{P}_1$ to $\hat{P}_3$;
   means for calculating a transformation vector at the corners of said quadrilateral object when the mapping of the four corners of said quadrilateral object is determined; and means for determining said transformation vectors at respective positions inside said quadrilateral object by linear interpolation using said transformation vector of each of the four corners of said quadrilateral object.

7. An apparatus for encoding a motion picture as set forth in claim 6, wherein said means for calculating the transformation vector uses a formula $$d_i = \hat{P}_i - P_i \quad i=1, 2, 3, 4,$$

wherein $d_i$ is a transformation vector indicating a degree of mapping.

* * * * *